United States Patent [19]

Madigosky

[11] Patent Number: 5,365,457
[45] Date of Patent: Nov. 15, 1994

[54] IN SITU DYNAMIC MATERIAL PROPERTY MEASUREMENT SYSTEM

[75] Inventor: Walter Madigosky, Silver Spring, Md.

[73] Assignee: The United States of America as represented by the Secretary of the Navy, Washington, D.C.

[21] Appl. No.: 963,177

[22] Filed: Oct. 19, 1992

[51] Int. Cl.[5] .................................................. G06F 15/20
[52] U.S. Cl. ........................... 364/506; 364/505; 364/507; 73/573; 73/574; 73/575; 73/81; 128/695; 128/739
[58] Field of Search ............... 364/506, 507, 508; 73/575, 584, 574, 78, 81, 89; 128/695, 739, 668, 740

[56] References Cited

U.S. PATENT DOCUMENTS

| | | | |
|---|---|---|---|
| 3,979,948 | 9/1976 | George et al. | 73/78 |
| 4,059,990 | 11/1977 | Glover et al. | 73/81 |
| 4,116,048 | 9/1978 | Appleford et al. | 73/83 |
| 4,331,026 | 5/1982 | Howard et al. | 73/81 |
| 4,352,292 | 10/1982 | Madigosky et al. | 73/575 |
| 4,418,573 | 12/1983 | Madigosky et al. | 73/574 |
| 4,665,625 | 5/1987 | Ireland | 33/530 |
| 4,699,000 | 10/1987 | Lashmore et al. | 73/81 |
| 4,848,141 | 7/1989 | Oliver et al. | 73/81 |
| 5,003,982 | 4/1991 | Halperin | 128/645 |
| 5,237,854 | 8/1993 | Jones | 73/38 |
| 5,269,181 | 12/1993 | Gibson et al. | 73/160 |

Primary Examiner—Kevin J. Teska
Assistant Examiner—Jacques Harold Louis-Jacques
Attorney, Agent, or Firm—Jacob Shuster

[57] ABSTRACT

Material is periodically indented by a probe driven at an oscillation frequency by a shaker regulated by an analyzer to which input measurement data is fed from a sensing head connecting the shaker to the probe for in situ measurement of material resistance to indentation to which such input data relates. A computer connected to the analyzer is programmed to calculate steady-state data on dynamic material properties as a time dependent function, from outputs of the analyzer restricted to limits determined from the input measurement data.

15 Claims, 2 Drawing Sheets

IN SITU DYNAMIC MATERIAL PROPERTY MEASUREMENT SYSTEM

BACKGROUND OF THE INVENTION

This invention relates generally to the determination of dynamic physical properties of materials, based on in-situ measurements.

The measurement of material resistance to indentation to determine a static hardness property, is generally well known in the art as disclosed for example in U.S. Pat. No. 4,331,026 to Howard et al. The determination of physical property of material by indentation thereof to obtain a readout of dynamic data by a comparative measurement technique as a function of many geometric variables, is disclosed in U.S. Pat. No. 3,979,948 to George et al. As to measurements obtained from material undergoing vibratory deformation for determination of dynamic property characteristics, U.S. Pat. Nos. 4,352,292 and 4,418,573 to Madigosky et al. are most relevant. However, the apparatus and methods disclosed in the latter patents are incapable of determining dynamic property data directly from material measurements performed in situ, or to determine the state of cure or rate of cure of the material being so measured.

Accordingly, it is an important object of the present invention to provide apparatus and method for rapid, in situ measurement of materials in a dynamic monitoring regime and yet provide absolute value data on material properties as a time dependent function.

In accordance with the foregoing objective, it is another object of the present invention to measure and determine characteristic properties of materials in manufacturing environments, including the provision of dynamic physical property data on materials undergoing a curing process.

SUMMARY OF THE INVENTION

In accordance with a disclosed embodiment of the present invention, a viscoelastic type of material is monitored in situ by periodic indentation at a simple oscillation frequency through a shaker vibrated probe having a hemispherical material engaging end tip. The material may be of semifinite or finite thickness and its resistance to indentation is measured in terms of amplitude and phase of the indentation force exerted through the probe and the probe acceleration. Such measurement is effected by means of an impedance sensing head through which the shaker displaces the probe. A fast Fourier spectrum analyzer determines the probe radiation impedance and limits from measurements made by the sensing head as functions of material resistance to indentation and shaker oscillation frequency to provide steady-state linear data inputs to a computer. The computer is programmed to calculate from such inputs a readout of dynamic material property data as a time dependent function, such as Young's modulus and loss factor varying with probe oscillation frequency.

BRIEF DESCRIPTION OF DRAWING FIGURES

Other objects, advantages and novel features of the invention will become apparent from the following detailed description of the invention when considered in conjunction with the accompanying drawing wherein.

DETAILED DESCRIPTION OF PREFERRED EMBODIMENT

Figure 1:
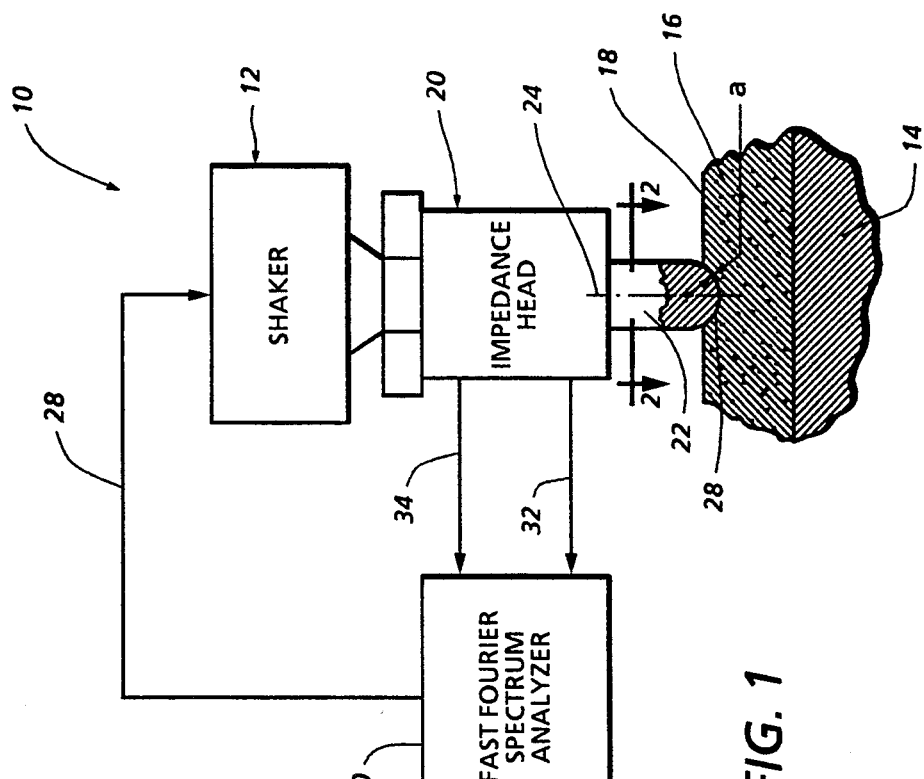
FIG. 1 is a partial simplified side view and block diagram of apparatus arranged in accordance with one embodiment of the present invention.
Figure 2:
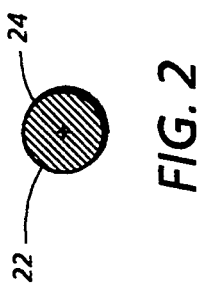
FIG. 2 is a transverse section view taken through a plane indicated by section line 2—2 in FIG. 1.

Referring now to the drawing in detail, FIG. 1 illustrates apparatus operative in accordance with the present invention, generally referred to by reference numeral 10. The apparatus according to one embodiment of the invention includes an electromagnetic shaker 12, such as a Bruel & Kjaer type 4810 or a Wilcoxon F3, suitably positioned in fixedly spaced relation to some supporting structure 14 on which material 16 being monitored is located for in situ dynamic measurement purposes. The material 16 may be of different viscoelastic types, including plastics, rubbers, metals, etc. Located between the shaker 12 and an exposed surface 18 of material 16 is an impedance sensing head 20, such as a Bruel & Kjaer type 8000 or Wilcoxon Z602WA, through which the shaker 12 drives a probe indenter 22. The resistance of the material 16 to indentation is thereby measured by the sensing head 20. The indentor probe 22 projects from the impedance sensing head 20 along an axis 24 substantially perpendicular to the surface 18 of material 16. According to the embodiment of the invention as illustrated in FIGS. 1 and 2, the indentor probe 22 is generally cylindrical and has a hemispherical end tip 26 with a spherical surface for intrusion into material 16 by contact therewith to indent its surface 18 in response to perturbing impulse forces applied by periodic reciprocation or vibration of the indentor along its axis 24.

Figure 3:
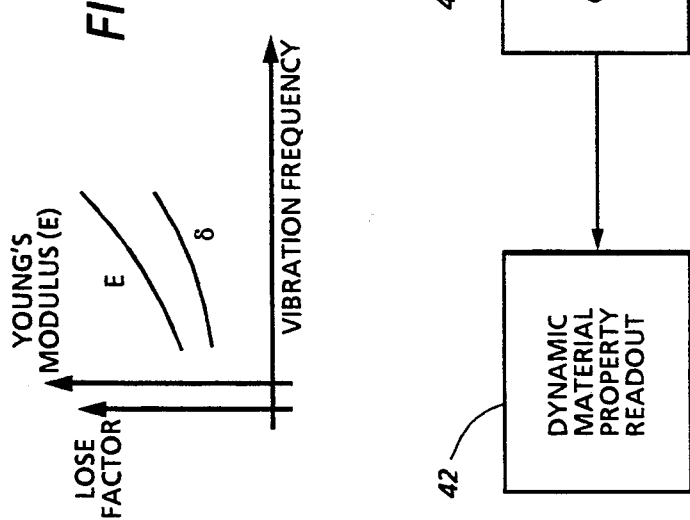
FIG. 3 is a graphical illustration of a typical printout of dynamic material property data obtained from the apparatus depicted in FIG. 1.

Vibration of the indentor probe 22 by the shaker 12, as diagrammed in FIG. 1, is regulated by a signal output 28 in the form of white noise generated by a fast Fourier transform spectrum analyzer 30, such as a Hewlett Packard Spectrum Analyzer type 3582A. An oscillating frequency range may accordingly be selected pursuant to the present invention as hereinafter explained. A vibration acceleration measurement output 32 and an indentation force measurement output 34 (in terms of amplitude and phase) are fed to the analyzer 30 from the impedance head 20 as diagrammed in FIG. 1 in order to produce rapid dynamic measurement data of a steady-state linear type fed to a computer 40, such as a Hewlett-Packard type. Calculations pursuant to algorithms derived from mathematical analysis hereinafter described, are performed by the computer 40 based on the resistance of the material to indentation in terms of radiation impedance ($Z_s$) in order to produce a dynamic material property readout 42 as diagrammed in FIG. 1. As graphically depicted in FIG. 3, such readout includes a display printout of Young's modulus (E) and loss factor ($\delta$) which varies as a function of probe vibration frequency ($\omega$). Based on a mathematical model conforming to apparatus 10 and material 16 as hereinbefore described, the complex shear modulus ($\mu$) of the material 16 is defined as:

$$\mu = \mu_1 + j\omega_2 = \mu_1(1 + \delta_s) \tag{1}$$

and its compressional modulus ($\lambda$) is defined as:

$$\lambda_3 \cong \lambda_1 + j\omega\lambda_2 = \lambda_1(1+\delta_L), \quad (2)$$

where ($\delta_s$) is the shear loss factor and ($\delta_L$) is the compressional loss factor.

The Young's Modulus (E) is related to the shear modulus ($E^1$) by:

$$E = 2(1+\sigma)\mu = E^1(1+J\delta_s) = 3\mu_1 \quad (3)$$

where $\sigma$ is Poisson ratio. For many materials $\sigma \cong \frac{1}{2}$ so that:

$$E^1 \cong 3\mu_1 \quad (4)$$

The radiation impedance (Zs) of the indentor tip 26 having a spherical tip surface of radius ($a$), is:

$$Z_s = -4\pi\rho\omega a^3 \frac{j}{3} \frac{\left(1 - \frac{3j}{ah} - \frac{3}{a^2h^2}\right) - 2\left(\frac{j}{ah} + \frac{1}{a^2h^2}\right)\left(3 - \frac{a^2k^2}{(jak+1)}\right)}{\left(\frac{1}{a^2h^2} + \frac{j}{ah}\right)\frac{a^2k^2}{(jak+1)} + (2 - a^2k^2(jak+1))}, \quad (5)$$

where (k) is a complex propagational constant, and is determined from the equations:

$$k^2 = \frac{\rho\omega^2}{2\mu + \lambda}, \quad (6)$$

$$h^2 = \frac{\rho\omega^2}{\mu}, \quad (7)$$

From an examination of the practical limiting values for the radiation impedance ($Z_s$), one limiting value ($Z_2$) is approached when $ak < 1$, in which case:

$$Z_2 = \frac{-2\pi\rho\omega a^3 j}{3}\left(1 - \frac{9j}{ah} - \frac{9}{a^2h^2}\right). \quad (8)$$

For high loss materials ($\omega\mu_2 > \mu_1$), another limiting value ($Z_3$) for the radiation impedance was determined to be:

$$Z_3 = \frac{-2\pi\rho\omega a^3 j}{3}\left[1 + 9\left(\frac{\mu_2}{(2\rho\omega a^3)^{\frac{1}{2}}} - 9j\left(\frac{\mu_2}{2\rho\omega a^2}\right)^{\frac{1}{2}}\right)\left[1 + \left(\frac{2\mu_2}{\rho\omega a^2}\right)^{\frac{1}{2}}\right]\right] \quad (9)$$

For low loss materials ($\omega\mu_2 < \mu_1$), yet another limiting value ($Z_4$) for the radiation impedance was determined to be:

$$Z_4 = \frac{-2\pi\rho\omega a^3 j}{3}\left\{\omega - \frac{9\mu_1}{\rho\omega a^2} - 9j\left[\left(\frac{\mu_1}{\rho a^2}\right)^{\frac{1}{2}} + \frac{\mu_2}{a^2}\right]\right\} \quad (10)$$

For a frequency range of interest (50–1000 Hz), the foregoing limits ($Z_2$, $Z_3$, $Z_4$) of the radiation impedance ($Z_s$) were found to be of primary interest. Assuming an indentor tip having spherical surface radius ($a$) of 1 mm, the foregoing equations (8) and (10) for the limits ($Z_2$) and ($Z_4$) were found by comparison to be in excellent agreement over a wide probe frequency range, diverging from ($Z_s$) only at very high frequencies. The impedance radiation limit ($Z_4$) for example may be utilized to obtain the shear modulus values ($\mu_1$) and ($\mu_2$) applicable to operation of the indentor 22 under control of analyzer 30 as a simple oscillator having at its tip end half the mass (m) of a sphere of radius ($a$). In such case, impedance (Z) is equal to measured acceleration (F/X), and:

$$m\ddot{X} + K^*x = F, \quad (11)$$

where ($k^*$) is the complex factor related to viscous damping, (F) is the indentation force and (X) is probe displacement. Where $k^* = k' + jk''$, the oscillator impedance (Z) is determined from the equation:

$$Z = mj\left(\omega - \frac{k'}{\omega m} - \frac{jk''}{\omega m}\right) \quad (12)$$

Based on the foregoing, the measured acceleration (F/X) is given by:

$$F/X = M + \frac{Z_4}{j\omega} = (M+m) - \frac{k^*}{\omega^2}, \quad (13)$$

where (M) is the real mass of the impedance head 20, and:

$$k' = 6\pi a\mu_1 = \omega^2[M + m - Re(F/X)] \quad (14)$$

$$k'' = 6\pi a^2\rho = \omega^2\left[\left(\frac{\mu_1}{\rho}\right)^{\frac{1}{2}} + \frac{\mu_2}{a\rho}\right] = \omega^2 m Im(F/X). \quad (15)$$

From the foregoing equations, the shear modulus or Young's modulus ($E_1$) and loss factor $\delta$ may be calculated by the computer 40 in accordance with the time dependent algorithms. Also, equation (8) for the radiation impedance limit ($Z_2$) may be inverted to produce values for the variable (1/h) therein. The validity and applicability of the foregoing mathematical analysis has been tested and confirmed by performance of experiments on the mathematical model described herein having different materials 16, such as Nitrile and Urethane rubbers, and the rate of cure of a urethane polymer. It is also evident from the foregoing mathematical analysis that apparatus 10 and the types of material 16 being monitored in situ, including material undergoing a curing process, form a satisfactory dynamic model in which the indentation force (F) is time dependent to excite within the material shear and compressional waves through which the complex shear modulus ($\mu$) and the compressional modulus ($\lambda$) respectively influence measurements by the impedance sensing head 20. From such measurements, dynamic data such as shear modulus or Young's modulus (E) and loss factors ($\delta$) are calculated as a time dependent function (such as frequency) pursuant to the algorithms represented by the equations hereinbefore set forth. The provision of steady-state, linear data on dynamic material property by in situ measurements of the material in manufacturing environments is thereby made possible including the provision of data relating to state or rate of cure of the material.

Figure 4:
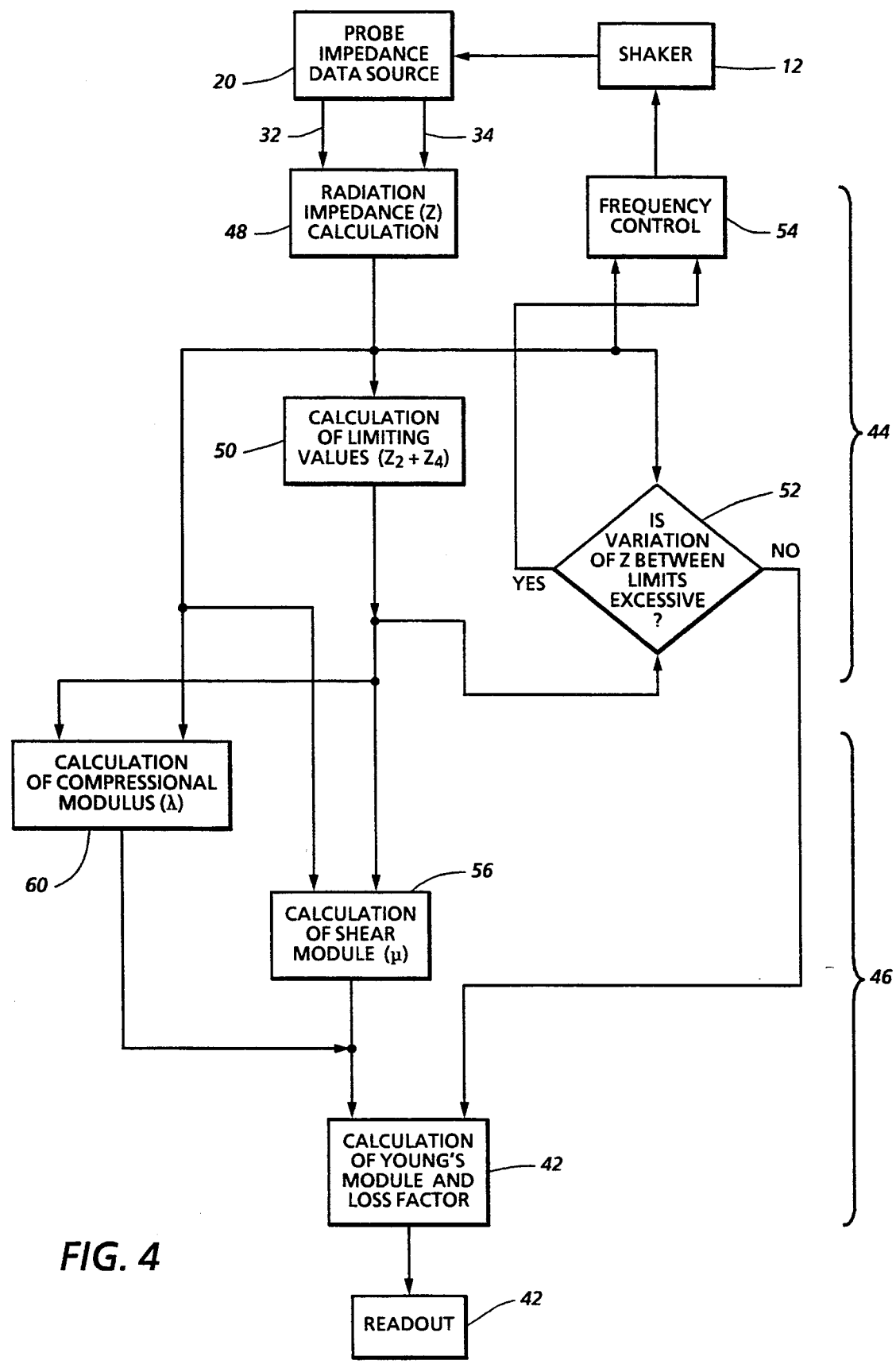
FIG. 4 is a block diagram of the computer software programs associated with the apparatus depicted in FIG. 1.

FIG. 4 summarizes by way of example programs 44 and 46 for collection of data and data analysis, such programs being respectively performed by the analyzer 30 and the computer 40 in accordance with the algorithm equations hereinbefore set forth. As indicted by block 48 in FIG. 4, calculations of material resistance to indentation in terms of radiation impedance (Z) are performed with respect to the probe acceleration measurement 32 and indentation force measurement 34 from the data source 20. Based on such calculations of radiation impedance as hereinbefore described, limiting values thereof are determined as denoted in block 50. If variation in radiation impedance ($Z_s$) between such limits is excessive, as denoted by block 52, frequency control 54 is enabled to render shaker 12 operative to restore simple oscillator performance within a given frequency range inducing the periodic probe indentation of the material 16 to be measured. Otherwise, the computer 40 is enabled to perform its calculations of the dynamic material property data in the form of Young's modulus and loss factor as denoted by block 56 in FIG. 4. Such calculation of the dynamic material property data is effected from calculations of shear moduli ($\mu$) and compressional modulus ($\lambda$) during probe vibration within the given frequency range as respectively denoted by diagram blocks 57 and 60 using Equation (5).

It should also be appreciated that different indentor shapes may be utilized as appropriate to particular tests or in-situ conditions including cure or rate of cure conditions. By selection of indentor shape, indentor response may be effectively modeled by the equations set forth herein so as to accommodate different indentor sizes, including sizes smaller relative to wavelength than those of the specific embodiment described herein.

Numerous other modifications and variations of the present invention are possible in light of the foregoing teachings. It is therefore to be understood that within the scope of the appended claims the invention may be practiced otherwise than as specifically described.

What claimed is:

1. A system for measurement of physical characteristics of a material, comprising: a probe having an end tip engageable with the material, shaker means driving the probe for indentation of the material at the end tip, impedance sensing means connected to the probe for monitoring said indentation of the material, analyzer means operatively connecting the impedance sensing means to the shaker means for limiting said indentation of the material by the probe to a frequency range within which material resistance to indentation varies as a time dependent function and computer means connected to the analyzer means for converting said time dependent function into dynamic material property data corresponding to the physical characteristics of the material.

2. The system as defined in claim 1 wherein said end tip of the probe is a hemispherical surface formation.

3. The system as defined in claim 2 wherein said frequency range to which the indentation of the material is limited, is between 50 Hz and 10,000 Hz.

4. The system as defined in claim 3 wherein said material resistance to indentation is measured in terms of amplitude and phase of indentation force exerted and acceleration of the probe.

5. The system as defined in claim 4 wherein said frequency range is defined by limits beyond which variation of radiation impedance of the probe is excessive.

6. The system as defined in claim 2 wherein said frequency range is defined by limits beyond which variation of radiation impedance of the probe is excessive.

7. The system as defined in claim 6 wherein said frequency range to which the indentation of the material is limited, is between 50 Hz and 10,000 Hz.

8. The system as defined in claim 1 wherein said material resistance to indentation is measured in terms of amplitude and phase of indentation force exerted and acceleration of the probe.

9. A method of determining dynamic physical properties of a material, comprising the steps of: indenting the material; monitoring the material during said indenting thereof for measurements of resistance thereof to indentation; analyzing said measurements to establish limits between which said measurements vary as a time dependent function; and calculating steady-state linear data from said measurements within the established limits.

10. The method of claim 9 wherein said measurements are in terms of amplitude and phase of indentation force and indention acceleration at a simple oscillation frequency.

11. The method of claim 10 wherein said steady-state linear data is in terms of Young's modulus and loss factor at said simple oscillation frequency.

12. The method of claim 9 wherein said steady-state linear data is calculated in terms of modulus and loss factor.

13. The method of claim 9 wherein said established limits form a frequency range between 50 and 10,000 Hz to which repetitive indenting of the material is restricted.

14. A system including: a probe having an indentation surface engageable with material; displacement means coupled to said probe for repetitively displacing said indentation surface into engagement with said material to induce indentation thereof as a time dependent function of resistance of the material to said indentation; and means for measuring said indentation of the material.

15. A system according to claim 14 wherein said time dependent function of the resistance of the material to said indentation is limited by repetitive displacement of the probe at a rate of about 50 to about 10000 Hz.

* * * * *